June 3, 1924.

C. J. LANDIN 1,496,274

MACHINE FOR CUTTING OUT ARTICLES FROM SHEET MATERIAL

Filed Dec. 27, 1919     6 Sheets—Sheet 4

Inventor.
Carl J. Landin
by Heard Smith & Tennant.
Attys.

June 3, 1924.

C. J. LANDIN 1,496,274

MACHINE FOR CUTTING OUT ARTICLES FROM SHEET MATERIAL

Filed Dec. 27, 1919    6 Sheets-Sheet 5

Inventor.
Carl J. Landin
by Heard Smith & Tennant
Attys.

June 3, 1924.

C. J. LANDIN 1,496,274

MACHINE FOR CUTTING OUT ARTICLES FROM SHEET MATERIAL

Filed Dec. 27, 1919    6 Sheets-Sheet 6

Inventor
Carl J. Landin
by Heard Smith & Tennant.
Attys.

Patented June 3, 1924.

1,496,274

UNITED STATES PATENT OFFICE.

CARL J. LANDIN, OF BOSTON, MASSACHUSETTS, ASSIGNOR TO HENRY M. CARRUTHERS, OF BOSTON, MASSACHUSETTS.

MACHINE FOR CUTTING OUT ARTICLES FROM SHEET MATERIAL.

Application filed December 27, 1919. Serial No. 347,658.

*To all whom it may concern:*

Be it known that I, CARL J. LANDIN, a citizen of the United States, residing at Boston, county of Suffolk, State of Massachusetts, have invented an Improvement in Machines for Cutting Out Articles from Sheet Material, of which the following description, in connection with the accompanying drawings, is a specification, like characters on the drawings representing like parts.

This invention relates to a machine for cutting out articles from sheet material by means of dies and has for its object to provide a machine of this type having various novel features which will be more fully hereinafter set forth.

In order to give an understanding of the invention, I have illustrated in the drawings a selected embodiment thereof which will now be described, after which the novel features will be pointed out in the appended claims.

My improved machine is of that type embodying a cutting block on which the sheet material is supported, a vertically-movable head situated above the cutting block and a plurality of dies carried by said head. The cutting block on which the sheet material rests is indicated at 1, and it is mounted on a table 2 which is adjustably carried in a suitable frame 3. The dies by which the articles are cut from the sheet material are indicated at 4, and these are secured to a vertically-reciprocating head 5 which is situated above the cutting block and which moves up and down in suitable guides 6 formed in the frame. The head 5 is given its vertical movement from a driving shaft 7 journaled in the frame, and for this purpose said shaft has thereon two eccentrics 8, the eccentric straps 9 of which are connected to the ends of the head by connections 10. The table 2 is supported in the frame 3 in such a way that it can be adjusted vertically to suit the requirements of use. For this purpose the table has depending from each end thereof two screws 11 which have screw-threaded engagement with nuts 12, each of which is held from vertical movement by being situated between two bearings 13 through which the corresponding screw 11 loosely passes.

Means are provided for turning all the nuts 12 simultaneously, thus to raise or lower the cutting block. Each nut is formed on its periphery with spiral gear teeth arranged to engage the teeth of a spiral gear 14 fast on a shaft 15 journaled in the frame. There are two spiral gears 14 on the shaft 15, and each is of such a size as to mesh with the two nuts 12 at one end of the table. The shaft 15 has a bevel gear 16 thereon which meshes with and is driven by a bevel gear 17 on a shaft 18, the latter shaft having a hand-wheel 19 thereon by which the shaft 15 can be turned. By this means the nuts 12 can all be rotated in one direction or the other thereby to raise or lower the table into the desired position.

Figure 3:
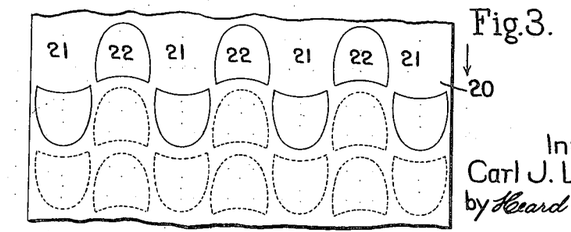
Fig. 3 shows the way in which the articles are cut out of the sheet material.
Figure 6:
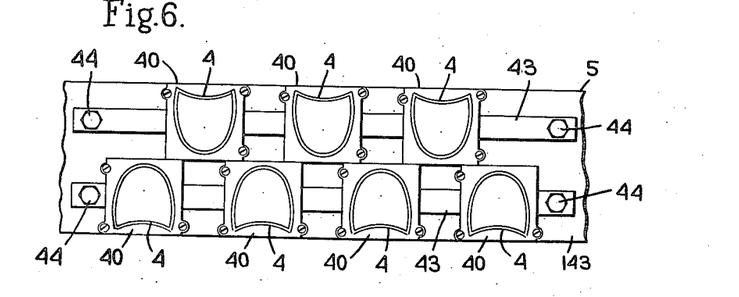
Fig. 6 is a bottom plan view of the dies.
Figure 7:
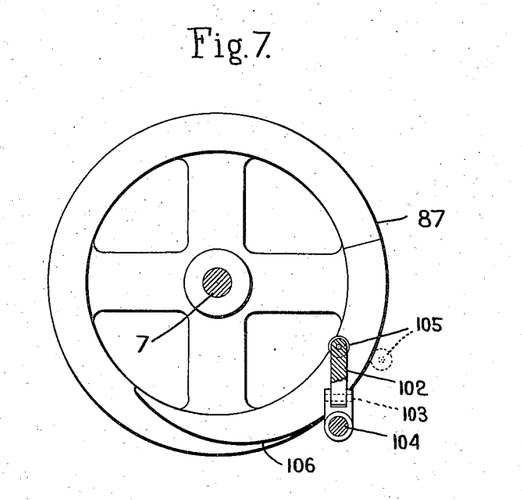
Fig. 7 is a detail of the brake-actuating cam.

While my machine is capable of using one or more dies, I prefer to use a plurality of dies and to arrange them in two rows with the dies in said two rows having a staggered relation, as shown in Fig. 6. These dies may be of any suitable shape, depending on the particular article which is to be died out. Merely as a matter of illustration, I have shown dies constructed to die out heel lifts or rubber heels from sheet material. The individual dies 4 are arranged in two rows with three dies in one row and four in the next. This arrangement is advantageous where the sheet material 20 from which the heels are to be cut is fed into the machine with an intermittent movement as the cutting proceeds. Assuming that said material is feeding in the direction of the arrow, Fig. 3, then at one operation of the head, the dies will cut heel lifts from sheet material, as shown by the full lines, Fig. 3. Then when the head is raised and the sheet material is fed forward one step, the spaces 21 between the holes 22 made by the dies in one row will be situated beneath the dies of the other row so that on the next operation of the head, heel blanks will be cut from these spaces 21. In this way very little waste will occur and yet the sheet material is handled in such a way that it will not break down between the dies during the cutting operation.

Figure 4:
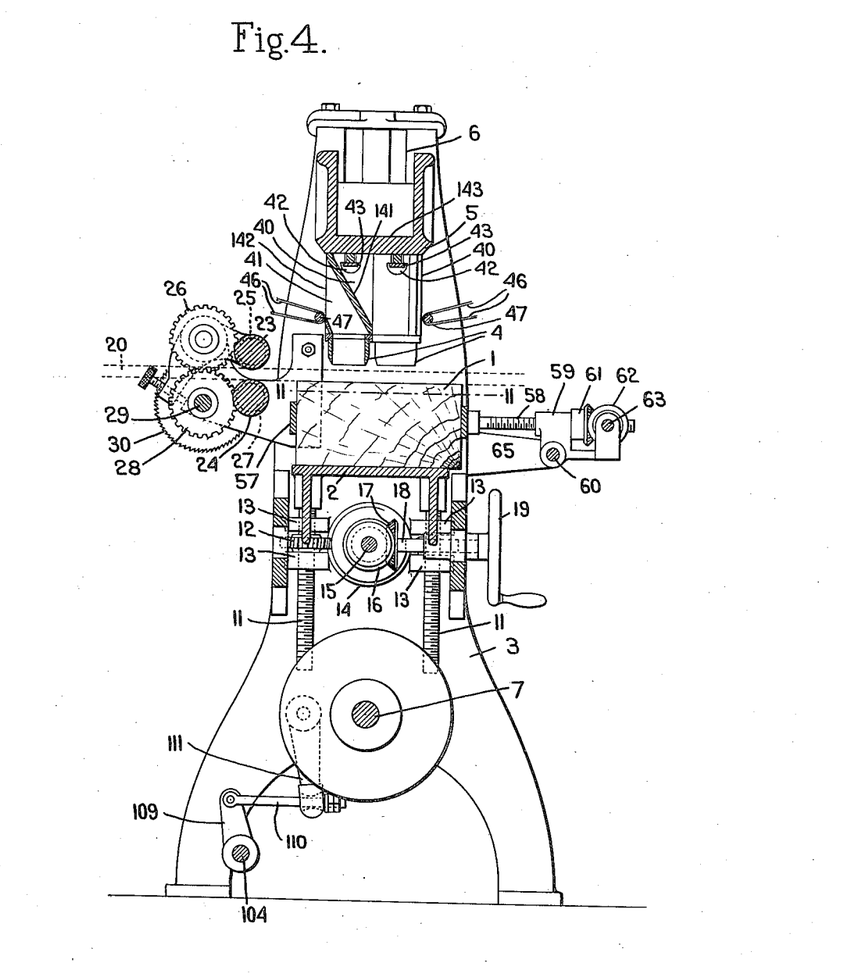
Fig. 4 is a section on the line 4—4, Fig. 1.
Figure 5:
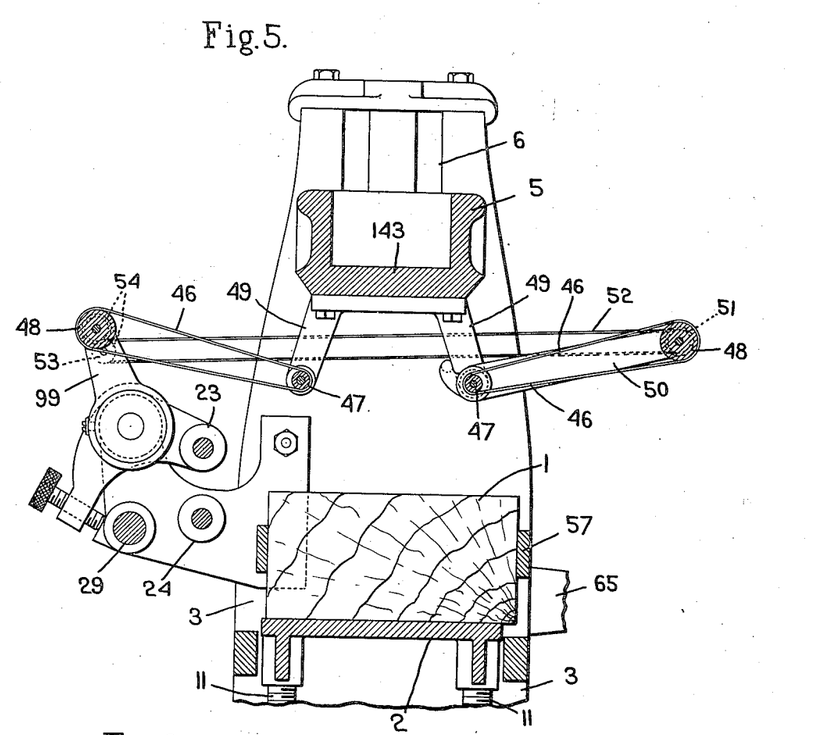
Fig. 5 is an enlarged section on the line 5—5, Fig. 1.

The means for feeding the sheet material 20 comprise two feed rolls 23, 24 between which the sheet material is fed. The roll 23 has a gear 25 rigid therewith that meshes with a gear 26, and the roll 24 has a gear 27 rigid therewith meshing with a gear 28. The two gears 26, 28 mesh with each other, as shown in Fig. 4. The gear 28 is fast on a shaft 29 which has fast thereon a ratchet wheel 30. This ratchet wheel is acted upon by a spring-pressed pawl 31 carried by a pawl-carrier 32 that is pivoted on the shaft 29, and the pawl-carrier is actuated from one of the eccentrics 8 by means of a connecting rod 33.

The rod 33 is connected to the eccentric so that during the upward movement of the head 5 the ratchet will be fed forward, and during the downward movement of said head, the pawl will click over the ratchet. The sheet 20, therefore, has its forward feeding movement while the dies are being elevated.

I have herein provided an adjustable connection between the rod 33 and the eccentric 8 so as to obtain a greater or less feeding movement at each reciprocation of the head, depending on the character of the article being died out. For this purpose, the eccentric 8 has rigid therewith a head 34 provided with ways 37 in which is slidably mounted a block 35 to which the connecting rod 33 is pivoted at 36. The ways 37 extend radially to the shaft 7 and the block 35 is constructed to be adjusted longitudinally of these ways so as to obtain a greater or less throw. This is provided for by means of an adjusting screw 38 which has screw-threaded engagement with the block 35 and also has screw-threaded engagement with the nut 39 carried by the head 34. The screw-threads on the screw 38 which engage the block 35 and nut 39 are oppositely disposed, one being right hand and the other left so that the turning of the screw 38 will give a more rapid adjustment of the block.

The dies 4 are of the well-known hollow type provided with a continuous cutting edge of a shape to cut out an article of the desired contour so that as the articles are cut they pass axially through the die.

One feature of the present invention relates to a construction by which the died-out articles after passing through the die are delivered automatically from the head to a carrier by which they are conveyed from the machine. The advantage of this is that the operator is relieved entirely of the necessity of removing the died-out articles from the die or from the machine.

In the preferred embodiment of my invention the head is provided with one or more delivery passages that communicate with the dies and into which the died-out articles pass from the dies. These delivery passages are arranged so that the articles are delivered therefrom to a chute, carrier, or other conveyor by which they may be deposited in suitable receptacles.

In the construction herein illustrated the delivery passages are formed so as to deliver the articles from the head in a direction transverse to the cutting movement of the die. These delivery passages may be provided for in a variety of ways without departing from the invention. One way which has some advantages is to provide the head with a plurality of individually-adjustable die-holding elements to which the dies are attached, said elements having the delivery passages formed therein. The advantage of this is that the dies are adjustable after they are positioned relative to each other.

In the illustrated construction the die-holding elements of the head are indicated at 40 and the delivery passage in each element is indicated at 41. The dies 4 are secured to the lower ends of the die-holding elements 40 of the head, and the delivery passages 41 are arranged with the inclined wall 141 and with the discharge opening 142. At each operation of the head the article being died out will force the previously died-out articles upwardly through the die and against the inclined wall 141, and as the column of died-out articles rises through the die and delivery passage 41 they are moved laterally by the wall 141 and are finally delivered through the discharge end 142 of the passage, the delivery being in a direction transverse to the cutting movement of the die.

Figures 8, 9, 10:
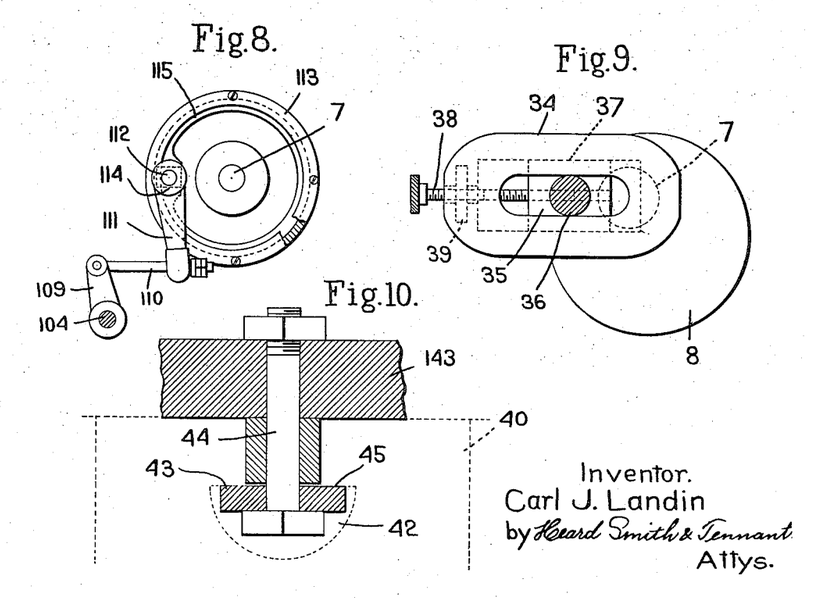
Fig. 8 is a view of the brake for stopping the machine.
Fig. 9 is a fragmentary view of the eccentric for actuating the feed pawl.
Fig. 10 is a sectional detail view showing the manner of connecting the die-holders to the head.
Figure 11:
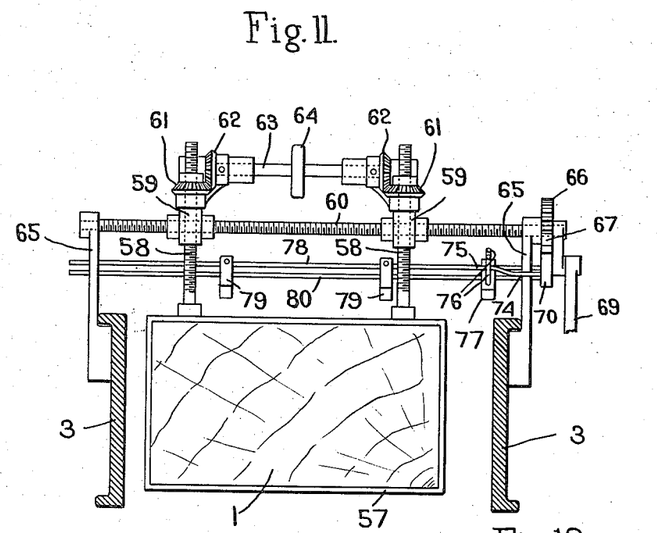
Fig. 11 is a sectional view on the line 11—11, Fig. 4.

This operation of delivering the articles is shown in dotted lines in Fig. 4. The die-holding elements 40 may be secured to the beam portion 143 of the head in any suitable way. I have herein illustrated each die-holder as having a transverse opening 42 therethrough to receive a clamping bar 43, these openings being arranged so that a single clamping bar may pass through the apertures of all the die holders in one row. Each clamping bar is secured to the beam 143 by means of clamping bolts 44. The openings 42 are provided with flat upper sides 45 against which the clamping bars 43 rest, as shown best in Fig. 10, and by tightening the clamping bolts 44 the die-holders are firmly clamped to the beam 143. By loosening the clamping bolt for any clamping bar, the die holders corresponding thereto can be adjusted longitudinally toward and from each other and can thus be placed in any desired relative position.

The dies are detachably secured to the die holders in any suitable way and thus it is possible to use dies of different sizes and shapes on the die holders. If the machine is being used for cutting out rubber heels, as illustrated in the drawings, the dies may be all of the same size, so that all the heels which are cut out will be the same size, or if desired, the dies may be of different sizes so that at each operation heels of several sizes will be cut out.

I have also provided means to receive the articles as they are delivered from the discharge passages 41 and to deliver them entirely free from the machine. The means herein shown comprises endless belt conveyors 46 situated on opposite sides of the machine and in position to receive the articles as they are discharged from the discharge openings 41. Each belt extends from one end to the other of the machine and passes around two direction rolls 47, 48. The two rolls 47 are journaled in brackets 49 carried by the head 5, and the rolls 48 are journaled in brackets 50 and 99. The rolls 48 are in the nature of drive rolls and they are connected to operate in unison. One of the rolls 48 has a sprocket wheel 51 fast thereto over which passes a sprocket chain 52 that extends from one side to the other of the machine and passes around another sprocket wheel 53 which has rigid therewith a gear 54 that meshes with a gear 90 rigid with the roll 48 that is journaled in the bracket 99. The shaft of this roll has at one end thereof a sprocket wheel 94, which is connected by a sprocket chain 56 to a sprocket wheel 55 rigid with the shaft 29. The delivery aprons 46 are thus moved in timed relation with the feed roll and will operate to deliver the articles from both sides of the machine.

The cutting bed 1 is made of wood as usual in machines of this character, and in order to avoid injury to the cutting face by the continual action of the dies against the same places in the face, I have provided herein means for automatically shifting the cutting block as the machine operates so that at each cutting operation the dies will operate on a fresh surface of the block. The cutting block is shown as set within a band or holder 57, and this holder has two screw-threaded stems 58 extending laterally therefrom. These stems extend through housings 59 which are supported on a screw-threaded adjusting shaft 60, the latter having screw-threaded engagement with the housings and being supported in brackets 65. These housings also carry bevel gear members 61 which have screw-threaded engagement with the stems 58, said gear members being permitted to rotate in the housings, but being held from movement longitudinally of the screws thereby. The gear members 61 mesh with bevel gears 62 on a cross-shaft 63 which has a hand-wheel 64 thereon. The screw-threaded shaft 60 is journaled in bearings formed in brackets or arms 65 that are secured to the frame 3 and said shaft, therefore, holds these housings from movement longitudinally of the screw-threaded stems 58. Hence by turning the shaft 63 the cutting block 1 may be adjusted in the direction transversely to the shaft 60. In addition to this adjustment of the block, I have provided means for automatically rotating the screw-threaded shaft 60 as the machine is operated thereby to give the stems 58 and the cutting bed 1 a gradual movement from one end to the other of the machine. For this purpose the shaft 60 is provided with a ratchet wheel 66 which is engaged by a pawl 67 pivotally mounted on a pawl-carrier 68 that is loosely mounted on the shaft 60. This pawl-carrying arm is connected by a link 69 to one of the connections 10 by which the head 5 is operated. Hence as said connection reciprocates vertically the pawl-carrying arm 68 is oscillated thereby causing the pawl to intermittently rotate the screw-threaded shaft 60. Such rotation gives the cutting block a gradual shifting movement laterally of the machine.

I have also provided means whereby when the cutting block reaches one end of the machine the direction of rotation of the shaft 60 is automatically reversed so that said cutting block will then be gradually moved toward the other end of the machine.

For this purpose the pawl 67 is a double-ended pawl so that either end thereof can be thrown into operative engagement with the ratchet wheel 66.

The pawl-carrier 68 has a pawl-reversing member 70 pivotally mounted thereon at 71 beyond the pawl, and said pawl-reversing member is provided with two adjustable screws 72 by which the pawl is reversed. Said pawl is also connected to the pawl-reversing member by two springs 73. The pawl-reversing member has an arm 74 extending laterally therefrom, which arm is bent so that the end 75 thereof is out of line with the main body. This arm 74 extends between two fingers 76 carried by an arm 77 and is made fast on a rod 78 that is slidably mounted in the arms 65. This rod 78 is also provided with two stop members 79 which are fast thereon and which are situated to be engaged by the screw-threaded stems 58 as the cutting block moves from end to end of the machine. The arms 77 and 79 are held in their proper position by means of a guide rod 80 on which they loosely slide. With this construction when the cutting block approaches the end of its travel toward either end of the machine, one of the stems 58 will engage an arm 79, thus shifting the rod 78 in the direction of its length, and this shifting of the rod will cause the arm 77 to be shifted longitudinally of the finger 74, and because of the special shape of said finger 74, such movement of the arm 77 will operate through the fingers 76 to turn the pawl-reversing member 70 sufficiently to cause it to reverse the position of the pawl 67. As soon as the pawl is reversed, then the oscillation of the pawl carrier will rotate the screw-threaded shaft 6 in the opposite direction, thus reversing the lateral movement of the cutting block 1. By this construction, therefore, the cutting block will be shifted at each operation of the head so that the action of the cutters will be spread over a considerable portion of the area of the block.

Figures 12, 13, 14:
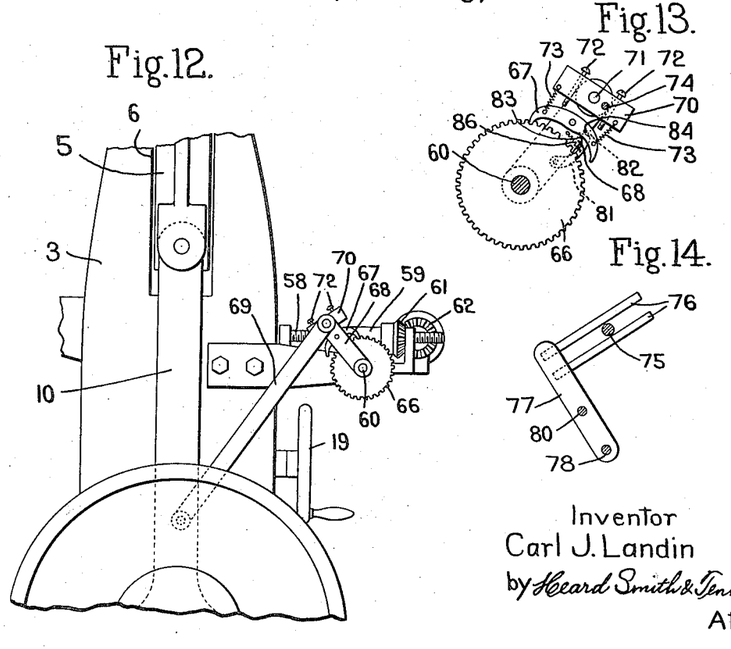
Fig. 12 is a fragmentary side view showing the opposite side of the machine from that illustrated in Fig. 2.
Fig. 13 is a detail of the mechanism for shifting the cutting block transversely.
Fig. 14 is a detail of the means for reversing the movement of the cutting block.

The pawl 67 is acted on by a spring-pressed positioning arm 81 that is pivotally mounted on the pawl-carrier 68, and is provided with a wedge-shaped nose having the two inclined faces 82 and 83. The pawl is provided with a pin or projection 84 with which the faces 82 and 83 co-operate to hold the pawl yieldingly in its operative position. When one end of the pawl is in engagement with the ratchet wheel 66, as shown in Fig. 13, said pawl is yieldingly held in this position by the engagement of the face 82 with the projection 84. When the pawl is reversed the projection wipes by the point 85, and the spring 86 which acts on the arm 81 throws said arm forward so that the engagement of the inclined face 83 with the projection 84 will complete the reversing movement of the pawl and yieldingly hold the opposite end in engagement with the ratchet wheel.

I have also provided herein a brake device for bringing the machine to rest with the head 5 raised. The machine is herein shown as being driven by a belt pulley 87 fast on the shaft 7 which is belted to a countershaft having fast and loose pulleys thereon. The driving belt (not shown) which drives the pulley 87 will be shifted from the fast to the loose pulley by any suitable belt shipper which it is not necessary to illustrate and which may be operated in any suitable way. I have herein shown at 88 a connection which may lead to the belt shipper, and by which the belt may be shifted from the fast to the loose pulley. This connection 88 is connected to an elbow-lever 89 pivoted at 100 on the frame, and said lever is connected by a link 101 to an arm 102 which is pivoted at 103 on a rock-shaft 104. The arm 102 carries a roll 105 which is adapted to be swung into and out of the path of a cam 106 formed on the belt pulley 87. The connection 101 is pivotally connected to the arm 102 at a point 108 at one side of the pivotal connection 103 for said arm so that when the member 101 is moved upwardly, the upper end of the arm 102 will be swung outwardly to carry the roll into the path of the cam 106. The shaft 104 has another arm 109 fast thereon which is connected by a link 110 to a brake-actuating arm 111. This arm 111 is pivotally mounted on a stud 112 carried by the frame 3, and has rigid therewith a brake actuating cam 114 which is received between the ends of an internal-expanding brake 115 which is situated within a brake drum 113 that is fast to the shaft 7.

Figure 1:
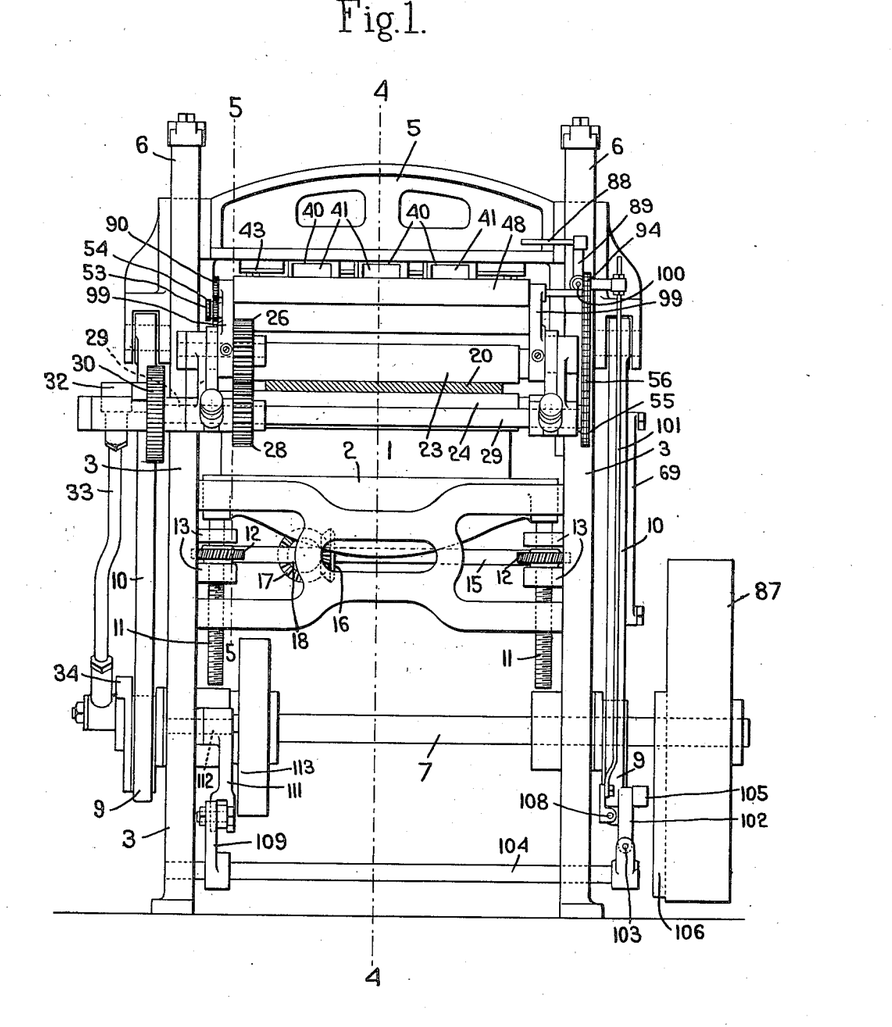
Fig. 1 is a front view of a machine embodying my invention.
Figure 2:
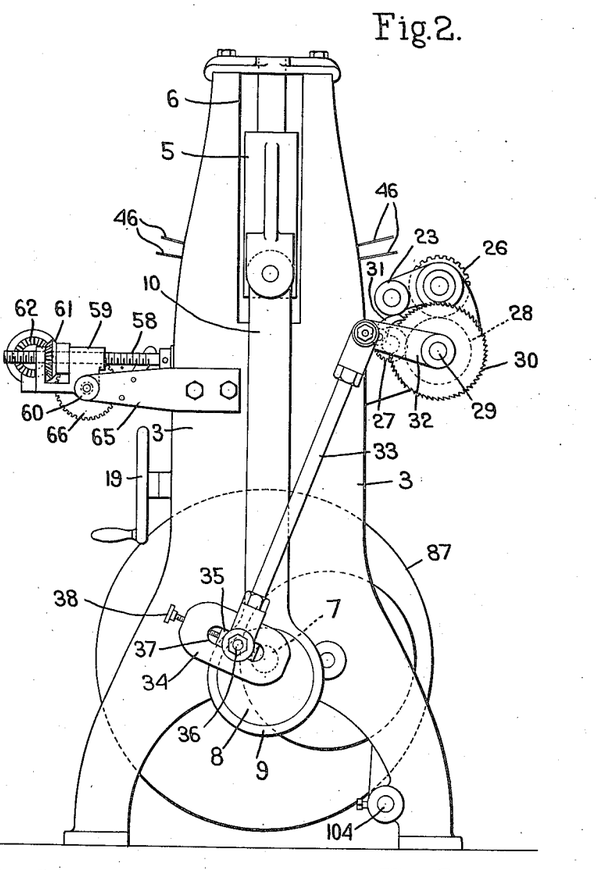
Fig. 2 is a side view thereof.

The member 88 is actuated to shift the belt by moving it toward the left, Fig. 1, and whenever this is done, such movement will move the connection 101 upwardly thereby swinging the arm 102 so as to bring the roll 105 into the path of the cam 106. As the belt pulley 87 continues to rotate the cam 106 will act against the arm 102, thus turning the rock-shaft 104 and applying the brake. Said cam is so positioned as to apply the brake and bring the machine to rest with the head 5 elevated.

I claim:

1. In a machine of the class described, the combination with a cutting block, of a head movable toward and from the cutting block, a plurality of die-holders secured to the head and arranged in a row, said die-holders being independently-adjustable on the head, a die sustained by each die holder, each die-holder having a delivery passage opening through its side through which the died-out articles are delivered.

2. In a machine of the class described, the combination with a cutting block, of a head movable toward and from the cutting block, a plurality of die-holders arranged in a row, a clamping bar by which said die-holders are all clamped to the head but which permits of individual adjustment of the die-holders relative to the head, and a hollow die carried by each die holder.

3. In a machine of the class described, the combination with a cutting block, of a head movable toward and from the block, two rows of die holders, a clamping bar for clamping the die holders of each row to the head, said die-holders having a staggered relation, and a hollow cutting die carried by each die-holder.

4. In a machine of the class described, the combination with a cutting block, of a vertically-reciprocating beam, a die holder secured thereto, an annular die carried by the die holder, the latter having a delivery passage open at the side above the die through which the died-out articles are delivered, feed rolls to feed sheet material across the cutting block, means for operating said feed rolls in timed relation with the movement of the beam, an endless delivery apron to receive the articles from the die holder, means for supporting one end of said apron from said beam, and means to operate said apron from the feed rolls.

5. In a machine of the class described, the combination with a frame, of a cutting block supported thereby, a beam, means to reciprocate the beam vertically, a die holder secured to the beam, an annular die carried by the die holder, the latter having a delivery passage open at the side above the die through which the die-out articles are delivered, feed rolls to feed sheet material across the cutting block, an endless delivery apron to receive the articles from the die holder, means for supporting one end of said apron from said beam and the other end from the frame, and means to operate said apron from the feed rolls.

6. In a machine of the class described, the combination with a cutting block, of a vertically-reciprocating beam, two rows of die-holders carried thereby, a die sustained by each die-holder, each die-holder having a delivery passage opening at the side thereof, the die-holders of one row having their delivery passage opening on one side of the machine and those in the other row on the other side of the machine, and two delivery aprons, one on each side of the machine for receiving the articles delivered from said holders.

7. In a machine of the class described, the combination with a cutting block, of a vertically-reciprocating beam, a die-holder carried thereby, an annular cutting die secured to the die-holder, the latter having a delivery passage through which the died-out articles are delivered, means for feeding sheet material across the cutting block, an endless delivery apron to receive the died-out articles from the holder, and means to acutate said apron by the feeding mechanism.

8. In a machine of the class described, the combination with a cutting block, of a die-holding head movable toward and from the block, a feed screw to shift the block, means to operate the feed screw automatically, and means to reverse periodically the direction of rotation of the feed screw.

9. In a machine of the class described, the combination with a cutting block, of a die-holding head movable toward and from the block, a feed-screw connected to the block and by which said block is shifted, means to rotate said feed screw, and means actuated by the shifting movement of the block to reverse the direction of rotation of the feed screw.

10. In a machine of the class described, the combination with a cutting block, of a die-holding head movable toward and from the block, means to actuate said head, a feed screw connected to said block by which it is shifted, means actuated by the head-actuating means to rotate the feed screw, and means to reverse the direction of rotation of the feed screw periodically.

11. In a machine of the class described, the combination with a cutting block, of a die-holding head movable toward and from the block, means to actuate said head, a feed screw connected to said block by which it is shifted, means actuated by the head-actuating means to rotate the feed screw, and means actuated by the shifting movement of the cutting block to reverse the direction of rotation of said feed screw.

12. In a machine of the class described, the combination with a cutting block, of a die-holding head, means to move said head toward and from the block, a feed screw connected to said cutting block, a ratchet wheel thereon, a reversible pawl for actuating said ratchet wheel, means to operate the pawl, and means actuated by the shifting movement of the cutting block to reverse the pawl.

13. In a machine of the class described, the combination with a cutting block adapted to sustain sheet material from which articles are to be died out, of a die-holding head, a die carried thereby, means to move the head toward and from the cutting block, sheet-feeding means for automatically feeding across the cutting block the sheet material that is to be acted on by the die, other means for automatically shifting the cutting block in timed relation with the movements of the head and in a direction transverse to that in which the sheet is fed, and other means for shifting the cutting block in a different transverse direction.

14. In a machine of the class described, the combination with a cutting block adapted to sustain sheet material from which articles are to be died out, of a die-holding head, a die carried thereby, means to move the head toward and from the cutting block, automatic means for feeding across the cutting block the sheet material that is to be acted on by the die, means operated by the head-actuating means for slightly shifting the cutting block at each operation of the head in a direction transverse to the direction in which the sheet material is fed, and other means for shifting the block in a different transverse direction.

In testimony whereof, I have signed my name to this specification.

CARL J. LANDIN.